United States Patent [19]

Reading

[11] Patent Number: 4,475,756

[45] Date of Patent: Oct. 9, 1984

[54] SHOVEL ADAPTER FOR HAND TOOL

[76] Inventor: Kenneth A. L. Reading, 11 Colborne St., Thornhill, Ontario, Canada, L3T 1Z4

[21] Appl. No.: 383,298

[22] Filed: May 28, 1982

[51] Int. Cl.³ .............................................. A01B 1/20
[52] U.S. Cl. ...................................................... 294/51
[58] Field of Search ..................... 294/51, 50, 52, 50.9, 294/49, 55.5, 59; 172/371, 372, 373, 374, 375, 380, 381; 7/1; 56/400.04, 400.05, 400.06, 400.03

[56] References Cited

U.S. PATENT DOCUMENTS

| | | | |
|---|---|---|---|
| 421,364 | 2/1890 | Vaag | 294/51 |
| 1,369,262 | 2/1921 | Olsen | 294/51 |
| 2,884,278 | 4/1959 | Waara | 294/51 |
| 3,334,939 | 8/1963 | Boric | 294/51 |
| 3,397,469 | 8/1968 | Browning | 294/51 |

Primary Examiner—James B. Marbert

[57] ABSTRACT

An adapter to convert a geologist's hammer for excavation is of blade form with a socket to receive the head of the hammer. The socket extends generally parallel to the blade so that the blade is transverse to the haft of the hammer. The adapter is retained by means of a pair of stops supported on resilient tangs on either side of the socket. The stops engage the rear face of the head of the hammer to locate it in the socket. The adapter also provides support for a cup that may be used to retain sediment recovered from the bed of a stream or a pit dug with the shovel attachment.

14 Claims, 7 Drawing Figures

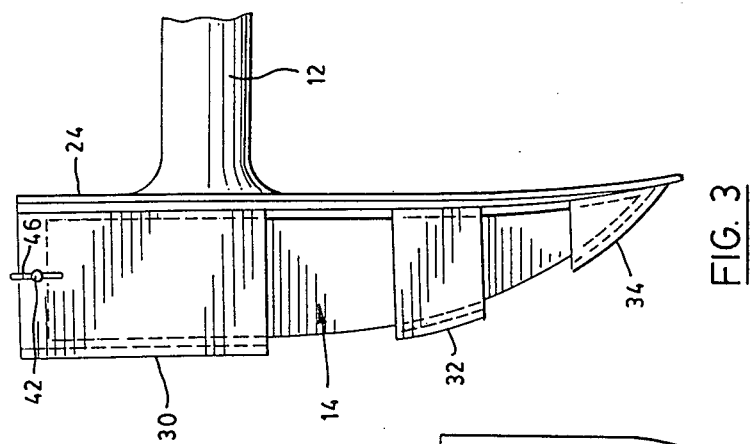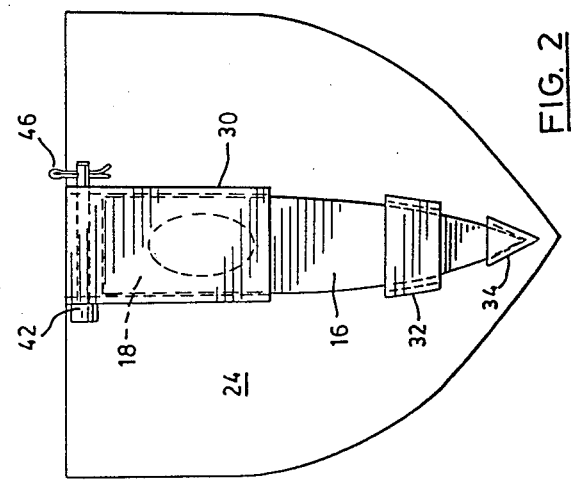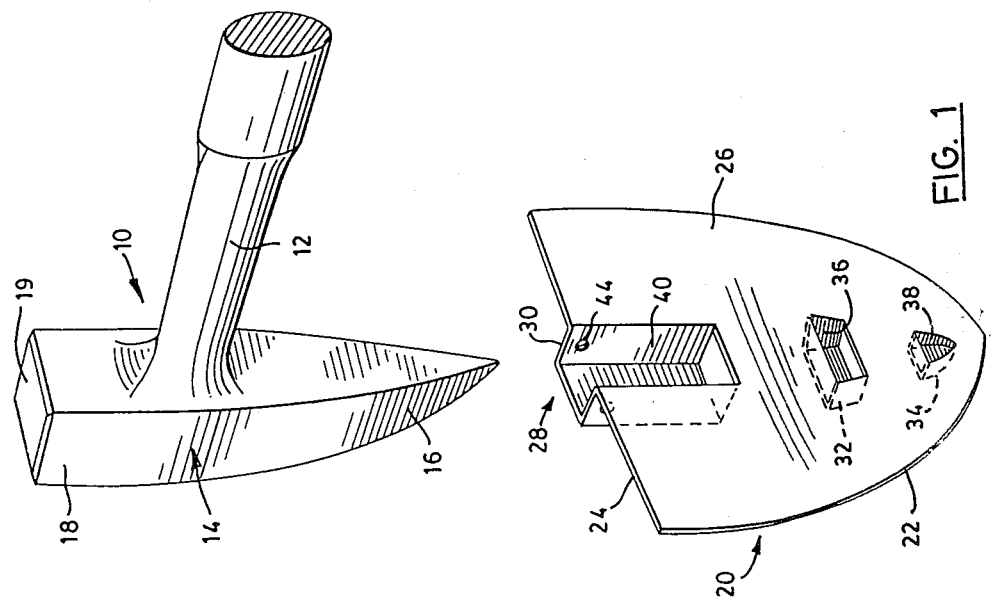

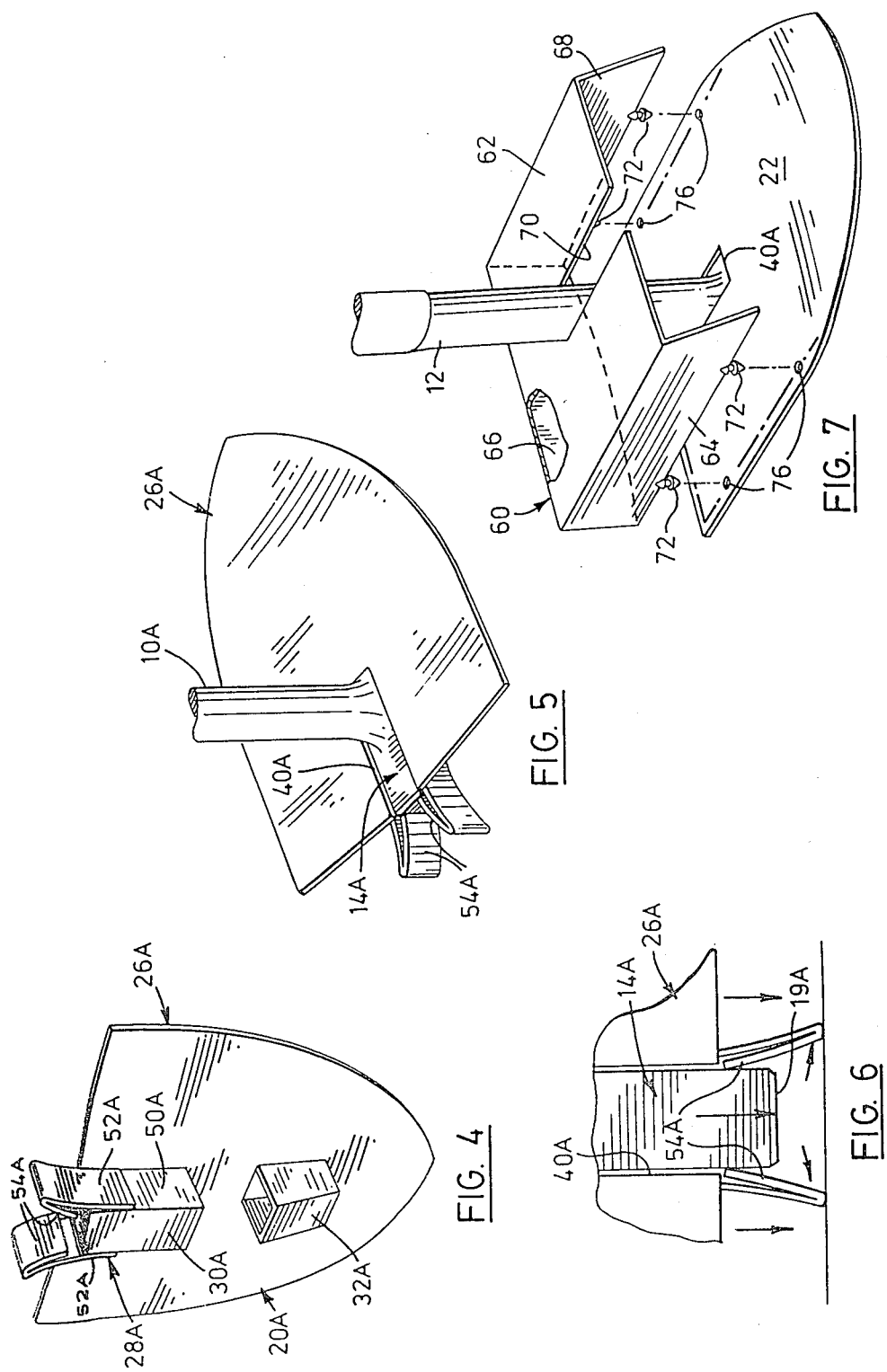

SHOVEL ADAPTER FOR HAND TOOL

The present application is a continuation-in-part application of U.S. patent application Ser. No. 224,692 filed Jan. 13, 1981, now abandoned.

The present invention relates to hand tools and in particular to an adapter to permit a stone breaking tool such as a geologist's hammer to be used for excavation.

It is common for prospectors and geologists to carry a hammer to assist in the collection of rock samples. These hammers are high quality tools usually having a haft integrally formed with the head. The head is provided with a planar surface to one side of the handle and a pointed spike to the other side. The surface and spike may be used as appropriate to break or pry samples.

Because most prospecting surveys are conducted in remote areas and therefore depend on light aircraft and backpacking, equipment weight is a prime consideration. On such expeditions there is frequently the need for a shovel or similar device to permit debris to be cleared and excavations made. However, the weight penalty has usually prohibited the carrying of a shovel for such purposes.

Various attempts have been made in the prior art to provide a hand tool that may be used for a number of different functions. Such tools have comprised a haft and head with provision for interchanging the work points on the head, usually by means of wedges or bolts. Such tools have not found favour because of their bulk, complexity and possible lack of robustness when used in arduous conditions.

It is therefore an object of the present invention to obviate or mitigate the above disadvantages.

The present invention is based upon the realization that the head of a conventional hammer provides a suitable attachment for an adapter that can be shaped to permit excavation.

According therefore to the present invention, there is provided; an adapter for a hand tool having a haft and a head connected to said haft and extending generally transverse thereto, said adapter including a blade defined by a pair of spaced planar surfaces delimited by a pair of intersecting side edges and an upper edge, a socket formed on one of said surfaces to receive said head, said socket having a longitudinal axis generally parallel to said surfaces and including wall members to encompass at least partially said head and inhibit movement between said head and said adapter transverse to said longitudinal axis, and releasable retaining means to prevent relative movement along said longitudinal axis, said blade including a recess extending from said upper edge of the blade and aligned with said socket to accommodate said haft upon insertion of said head into said socket, whereby upon insertion of said head into said socket, said blade extends generally transverse to said haft to permit use of the blade for excavation.

Embodiment of the invention will now be described by way of example only with reference to the accompanying drawings in which:

FIG. 1 is a perspective view showing a hammer and adapter in a disassembled condition, FIG. 2 is an end elevation showing the hammer and adapter of FIG. 1 assembled, FIG. 3 is a side elevation showing the hammer and adapter assembled, FIG. 4 is a perspective view of an alternative embodiment of adapter with integrally formed stops, FIG. 5 is a rear perspective view of the adapter of FIG. 4 mounted on a geologist's hammer, FIG. 6 is a view showing the release of the hammer from the adapter, FIG. 7 is a perspective view of the adapter and hammer of FIG. 5 with a sediment cup attachment.

Referring now to the drawings, a geologist's hammer 10 includes a haft 12 integrally formed with a head 14. The head 14 extends generally transverse to said haft and includes a spike 16 to one side of the haft and a stump 18 having a planer flat surface 19 to the other.

An adapter 20 is provided to enable the hammer 10 to be used for excavation. The adapter comprises a blade 22 defined by a pair of generally planar surfaces 24–26. A socket, generally designated 28 is formed on the surface 24 and is dimensioned to receive snugly the head 14. The longitudinal axis of the socket 28 is generally parallel to the surface 24 although the tapered profile of the spike 16 causes the axis to converge with the blade 22.

The socket 28 is formed from a plurality of straps 30, 32, 34 which project from the blade 22 and partially encompass the head 14. The straps 30, 32 34 are spaced apart along the longitudinal axis of the socket 28 with the terminal strap 34 arranged to cover the pointed end of the spike 16.

The blade 22 and straps 30, 32, 34 are conveniently formed in a stamping operation from a single planar metal blank. The die used in the stamping pierces the blank and stretches the material to form the straps 30, 32, 34. This technique leaves a pair of apertures 36, 38 in the blade 22 adjacent the straps 32–34 and a recess 40 at the upper edge of the blade 22 adjacent the strap 30. The recess 40 accommodates the haft 12 to permit the socket 28 to be of greater depth than the overall length of the head 14. The upper edge of the strap 30 is therefore slightly proud of the flat face of the stump 18 and a pin 42 is passed through a pair or holes 44 in opposed portions of the strap 30 to retain the head 14 in the socket 28. The pin 42 is secured by a split pin 46 which may be readily removed.

It will be apparent therefore that the hammer 10 may be converted for use as an excavating tool by simply sliding the head 14 into the socket 28. The straps 30, 32 and surface 24 prevent movement in a direction transverse to the longitudinal axis of the socket 28 and the pin 42 can be inserted to prevent longitudinal movement. The snug fit of the head into the socket 28 also assists in preventing relative movement between the head 14 and the blade 22. The adapter does not therefore affect the integrity of the hammer 10 and yet is relatively light in weight and does not require a complex mechanism to permit conversion.

It will be apparent that the socket 28 could be formed with a continuous wall if desired, such as by casting the blade and socket or by riveting or welding the socket to the blade, but it is believed that the stamping from a blank provides an economical and simple manner of producing the adapter.

An alternative embodiment of the adapter 20 is shown in FIGS. 4 through 6 in which similar reference numerals to those of FIGS. 1 through 3 are used with the suffix A added for clarity. It will be noted that in this embodiment the socket 28A is formed from two straps 30A and 32A. The straps 30A–32A are formed as separate components and are welded or otherwise attached to the blade 26A to define the socket. The strap 30A terminates just short of the upper edge of the blade 26A so that the recess 40A is slightly longer than the depth of the strap 30A.

Attached to the side portions, denoted 50A of the strap 30A is a pair of resilient tangs 52a. The tangs are attached to the side portions 50A approximately midway along the side walls and project beyond the side walls above the upper edge of the blade 22A. The tangs flare outwardly and each carries a stop member 54A. The stop members 54A are formed from short lengths of material of similar widths to the tangs which diverge from an attachment point to the tang 52A so that the pair of stop members 54A present a pair of converging surfaces at the entrance to the socket 28A.

To attach the adaptor 20A to the hammer 10A the spike 16A is slid into the recess between the stop members 54A. The head 14A of the hammer 10A engages the stop members and forces them apart. The resilience of the tangs 52A and the location of their attachment to the side portion 50A of the strap 30A permits the stop members to move apart sufficiently to allow the head to pass between the stop members. Once the planar end surface 19A passes below the stop members 54A, the resilience of the tangs moves the stop members toward one another behind end face and into abutment with the end face 19A. This effectively locates the adapter 20A on the head 14A of the hammer 10A to prevent the unintentional removal of the adapter 20A. The straps 30A-32A are also made as a close fit for the tapered head 14A of the hammer so that a fictional engagement is achieved between the head and the socket 28A.

To remove the adapter from the head, the hammer 10A is inverted and a sharp blow struck on the extreme ends of the tangs. The blow in the direction of the longitudinal axis of the socket causes the tangs to spread by virtue of the flaring of the tangs and moves the stop members 54A out of abutment with the end face 19 A. The stump 18 A may then pass between the stop members to maintain them in a spread position. The adapter may then be pulled off the head 14A so that the hammer 10A may be used in a conventional manner.

It will be apparent that the stop members 52A are permanently attached to the adapter 20A and therefore the possibility of losing the attachment device is eliminated. Further, the disposition of the stop members provides a positive restraining force for the head 14A within the socket 28A to ensure that the blade 20A is not intentionally removed.

The adapter 20A may also be used as part of a sample collection device for collecting sediment from river beds or similar locations. Such samples are normally collected by hand by the prospector. A device that converts the blade 20A into a sample collecting scoop is shown in FIGS. 7 and 8. Cup attachment 60 comprises rear face 62 and three sides, 64, 66, 68. The rear face 62 includes a slot 70 that fits around the haft 12 of the geologist's hammer. The side 66 is shaped to fit the contour of the blade 22 and interconnects the two sides 64-66. The sides 62-66 extend beyond the end face 62 and taper toward the blade 22. The scoop 60 may be moulded from a suitable plastics material of the necessary toughness and strengths and has four resilient buttons 72 disposed around the periphery of the sides 64, 66, 68 and projecting towards the surface 26 of the blade 22. The blade 22 is formed of four corresponding holes, designated 76 to receive the buttons 74. To mount the attachment on the blade 22 after the hammer has been inserted into the socket it is simply necessary to slide the attachment along the haft of the hammer and press the buttons into the holes 76. The buttons are moulded so as to provide an enlarged head which passes through the hole and retains the attachment on the blade. To release the attachment it is simply necessary to pull the buttons back through the holes. The sides 64, 66, 68 are contoured so as to be a snug fit with the blade 22. The attachment and blade therefore cooperate to define an open ended scoop which may be dug into the bed of the river by means of the haft of the hammer. A sample collects in the volume defined between the blade and the attachment although the water will in fact drain out of this area by passing between the sides and the blade.

It will be seen therefore that the utility of the attachment 20 is further improved by the provision of the attachment 60, which in itself comprises only one lightweight component.

I claim:

1. An adapter for a hand tool having a haft and a head connected to said haft and extending generally transverse thereto, said adapter including a blade defined by a pair of spaced planar surfaces delimited by a pair of intersecting side edges and an upper edge, a socket formed on one of said surfaces to receive said head, said socket having a longitudinal axis generally parallel to said surfaces and including wall members to encompass at least partially said head and inhibit movement between said head and said adapter transverse to said longitudinal axis, and releasable retaining means to prevent relative movement along said longitudinal axis, said blade including a recess extending from said upper edge of the blade and aligned with said socket to accommodate said haft upon insertion of said head into said socket, whereby upon insertion of said head into said socket, said blade extends generally transverse to said haft to permit use of the blade for excavation.

2. An adapter according to claim 1 wherein said releasable retaining means includes a pin extending between said wall members in the region of said recess to thereby pass over said head and retain said head within said socket.

3. An adapter according to claim 1 wherein said wall members include a plurality of straps spaced along said longitudinal axis and projecting from said one surface.

4. An adapter according to claim 3 wherein one of said straps covers the end of said head remote from said handle.

5. An adapter according to claim 3 wherein said straps are punched from said blade to leave an aperture in said surfaces adjacent said straps.

6. An adapter according to claim 1 wherein said releasable retaining means comprises at least one resilient tang extending from a respective wall member of said socket beyond a rear surface of a head located in said socket, said tang being secured to one end to said wall member and having its opposite end spaced further from said longitudinal axis than said one end, said opposite end having an abutment surface directed away from said socket and a stop member extending toward said longitudinal axis and said rear surface to retain said head in said socket, the offset between said ends of said tang constituting means to release said head from said socket upon a blow being applied to said abutment surface, said blow causing movement of said stop member away from said longitudinal axis to allow said head to be withdrawn from said socket.

7. An adapter according to claim 6 wherein said releasable retaining means comprises a pair of tangs are provided, respective tangs being connected to opposed wall members of said socket and said straps diverging from one another in a direction toward said opposite end.

8. An adapter for a hand tool having a haft and a head connected to said haft and extending generally perpendicular thereto, said adapter including a blade, an elongate socket formed on said blade and adapted to receive said head to support said blade generally perpendicular to said haft, said socket including wall members disposed about the longitudinal axis of said socket to encompass at least partially said head and inhibit relative movement between said head and said blade in a direction transverse to the longitudinal axis of said socket, and releasable retaining means comprising at least one resilient tang extending from a respective wall member of said socket beyond a rear surface of a head located in said socket, said tang being secured at one end to said wall member and having its opposite end spaced further from said longitudinal axis than said one end, said opposite end having an abutment surface directed away from said socket and a stop member extending toward said longitudinal axis and said rear surface to retain said head in said socket, the offset between said ends of said tang constituting means to release said head from said socket upon a blow being applied to said abutment surface, said blow causing movement of said stop member away from said longitudinal axis to allow said head to be withdrawn from said socket.

9. An adapter according to claim 8 wherein said tang is curved away from said longitudinal axis adjacent said stop member.

10. An adapter according to claim 8 wherein a pair of tangs are provided, respective tangs being connected to opposed wall members of said socket and said straps diverging from one another in a direction toward said opposite end.

11. An adapter according to claim 10 wherein each of said stop members project toward said longitudinal axis and present a pair of converging surfaces to a head entering said socket to facilitate insertion of said head.

12. An adapter according to claim 11 wherein the connection between said stop member and said strap constitute said abutment surface.

13. An adapter for a hand tool having a haft and a head connected to said haft and extending generally transverse thereto, said adapter including a blade, a socket formed on said blade to receive a head of a hand tool and support said blade generally perpendicular to said haft, retaining means to retain said head in said socket, and a scoop member releasably attachable to said blade, said scoop member comprising a rear surface and wall means extending around a portion of the rear surface to maintain said rear surface in spaced relationship from said blade, said rear surface, wall means and blade thereby defining a scoop to permit collection of material thereon.

14. An adapter according to claim 13 wherein said rear surface includes a notch to permit passage of said haft therethrough.

* * * * *